US00RE47930E

(19) United States
(12) Reissued Patent
Cho

(10) Patent Number: US RE47,930 E
(45) Date of Reissued Patent: Apr. 7, 2020

(54) MUFFLER FOR COMPRESSOR AND COMPRESSOR HAVING THE SAME

(71) Applicant: LG ELECTRONICS INC., Seoul (KR)

(72) Inventor: Jaeho Cho, Seoul (KR)

(73) Assignee: LG ELECTRONICS INC., Seoul (KR)

(21) Appl. No.: 15/903,346

(22) Filed: Feb. 23, 2018

Related U.S. Patent Documents

Reissue of:
(64) Patent No.: 9,587,634
Issued: Mar. 7, 2017
Appl. No.: 14/259,087
Filed: Apr. 22, 2014

(30) Foreign Application Priority Data

Apr. 24, 2013 (KR) ..... 10-2013-0045641

(51) Int. Cl.
*F04B 39/00* (2006.01)
*F04B 39/12* (2006.01)
*F04B 39/14* (2006.01)

(52) U.S. Cl.
CPC ..... *F04B 39/0072* (2013.01); *F04B 39/0027* (2013.01); *F04B 39/0061* (2013.01); *F04B 39/125* (2013.01); *F04B 39/14* (2013.01)

(58) Field of Classification Search
CPC .. F04B 39/0061; F04B 39/14; F04B 39/0072; F04B 39/125; F04B 39/0027
See application file for complete search history.

(56) References Cited

U.S. PATENT DOCUMENTS 4,573,880 A 3/1986 Hirano et al.
5,201,640 A * 4/1993 Heinzelmann ..... F04B 39/0005 181/229

(Continued)

FOREIGN PATENT DOCUMENTS

CN 1584330 2/2005
CN 2895794 5/2007

(Continued)

OTHER PUBLICATIONS

U.S. Office Action issued in U.S. Appl. No. 14/259,087 dated Mar. 28, 2016.

(Continued)

*Primary Examiner* — Terrence R Till
(74) *Attorney, Agent, or Firm* — Ked & Associates LLP

(57) ABSTRACT

A muffler for a compressor and a compressor having the same are provided, in which a suction noise device and a discharge noise device may be integrally formed to reduce a number of components of a suction side muffler and a discharge side muffler so as to reduce leakage of refrigerant generated at an assembled portion of the muffler, and to reduce a length of a suction passage and a discharge passage. Such a division between the suction noise device and the discharge noise device may prevent discharged refrigerant from unintentionally heating suctioned refrigerant, which may reduce suction loss. The formation of the suction and discharge noise devices using a plastic material may reduce fabricating costs, and the structures of the suction and discharge side noise spaces may be simplified and noise removal effects may be improved, reducing an overall size of the muffler and improving noise effects.

29 Claims, 11 Drawing Sheets

(56) References Cited

U.S. PATENT DOCUMENTS

| | | | | |
|---|---|---|---|---|
| 5,288,212 | A * | 2/1994 | Lee | F04B 39/125 181/229 |
| 5,328,338 | A * | 7/1994 | Hirano | F04B 39/102 137/527 |
| 5,435,700 | A | 7/1995 | Park | |
| 6,017,197 | A * | 1/2000 | Jensen | F04B 39/0055 181/249 |
| 2005/0002798 | A1* | 1/2005 | Bjerre | F04B 39/0072 417/312 |
| 2005/0042114 | A1 | 2/2005 | Seo | |
| 2007/0264137 | A1* | 11/2007 | Park | F04B 39/0061 417/313 |
| 2009/0038329 | A1* | 2/2009 | Alvarenga | F04B 39/0066 62/296 |
| 2009/0068029 | A1* | 3/2009 | Brabek | C12N 15/1006 417/312 |
| 2009/0214367 | A1* | 8/2009 | Brabek | F04B 39/06 417/559 |
| 2009/0242323 | A1* | 10/2009 | Densmore | F02M 35/1244 181/229 |
| 2010/0290939 | A1* | 11/2010 | Freiberger | F04B 39/10 417/545 |
| 2011/0014065 | A1* | 1/2011 | Park | F04B 39/0061 417/312 |
| 2012/0257993 | A1 | 10/2012 | Ono et al. | |

FOREIGN PATENT DOCUMENTS

| | | | |
|---|---|---|---|
| CN | 101180465 | | 5/2008 |
| CN | 101194106 | | 6/2008 |
| CN | 202132204 | | 2/2012 |
| CN | 102971533 | | 3/2013 |
| EP | 1 477 672 | A2 | 11/2004 |
| JP | 3-258981 | | 11/1991 |
| JP | 2005-069224 | | 3/2005 |
| KR | 10-2005-0018177 | | 2/2005 |
| KR | 10-2005-0019959 | | 3/2005 |
| KR | 10-2005-0071261 | | 7/2005 |
| WO | WO 2011/137474 | | 11/2011 |
| WO | WO 2011137474 | A2 * | 11/2011 ..... F04B 39/0027 |

OTHER PUBLICATIONS

U.S. Office Action issued in U.S. Appl. No. 14/259,087 dated Aug. 26, 2016.

Korean Office Action dated Dec. 20, 2017.

Korean Office Action dated Dec. 28, 2017.

Korean Office Action dated Apr. 16, 2018.

Chinese Office Action dated Sep. 17, 2018.

Chinese Office Action dated Oct. 29, 2018.

English Translation for Specification of WO2011/137474 (Zippl) obtained Aug. 17, 2016.*

European Search Report issued in Application No. 14165527.4 dated May 13, 2015.

Chinese Office Action dated Nov. 27, 2015.

* cited by examiner

MUFFLER FOR COMPRESSOR AND COMPRESSOR HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application *is a Reissue Application of prior U.S. Pat. No. 9,587,634 issued Mar. 7, 2017* (*U.S. patent application Ser. No. 14/259,087 filed Apr. 22, 2014*), *which* claims priority under 35 U.S.C. §119 to Korean Application No. 10-2013-0045641 filed in Korea on Apr. 24, 2013, whose entire disclosure is hereby incorporated by reference.

BACKGROUND

1. Field

This relates to a compressor, and particularly, to a muffler for a compressor having a suction muffler and a discharge muffler, and a compressor having the same.

2. Background

A hermetic compressor may include a motor installed in a hermetic casing, and a compression device receiving a driving force from the motor to compress a refrigerant. Such a compressor may be applied to a refrigerating system of a refrigerator, an air conditioner and the like.

Hermetic compressors may be classified into various types, such as a rotary compressor, a scroll compressor, a reciprocating compressor, and the like according to a compression method and a type of refrigerant used. The reciprocating compressor may compress a refrigerant by reciprocating a piston within a cylinder. The reciprocating compressor may be a vibration type or a connection type reciprocating compressor according to a driving method of a piston. In the vibration type reciprocating compressor, the piston may reciprocate in the cylinder and vibrate while connected with a mover of a reciprocating motor, thereby compressing a refrigerant. In the connection type reciprocating compressor, the piston may reciprocate in the cylinder while connected with a rotation shaft of a rotation motor, thereby compressing a refrigerant.

In the vibration type reciprocating compressor, a suction side through which a refrigerant is introduced into a compression chamber of a cylinder and a discharge side through which a refrigerant is discharged out of the compression chamber may be arranged at one side or two opposite sides of the piston. In the connection type reciprocating compressor, the suction side and the discharge side may be arranged at one side of the piston.

BRIEF DESCRIPTION OF THE DRAWINGS

The embodiments will be described in detail with reference to the following drawings in which like reference numerals refer to like elements wherein.

DETAILED DESCRIPTION

Description will now be given in detail of a muffler for a compressor, and a compressor having the same according to the exemplary embodiments, with reference to the accompanying drawings.

Figure 1:
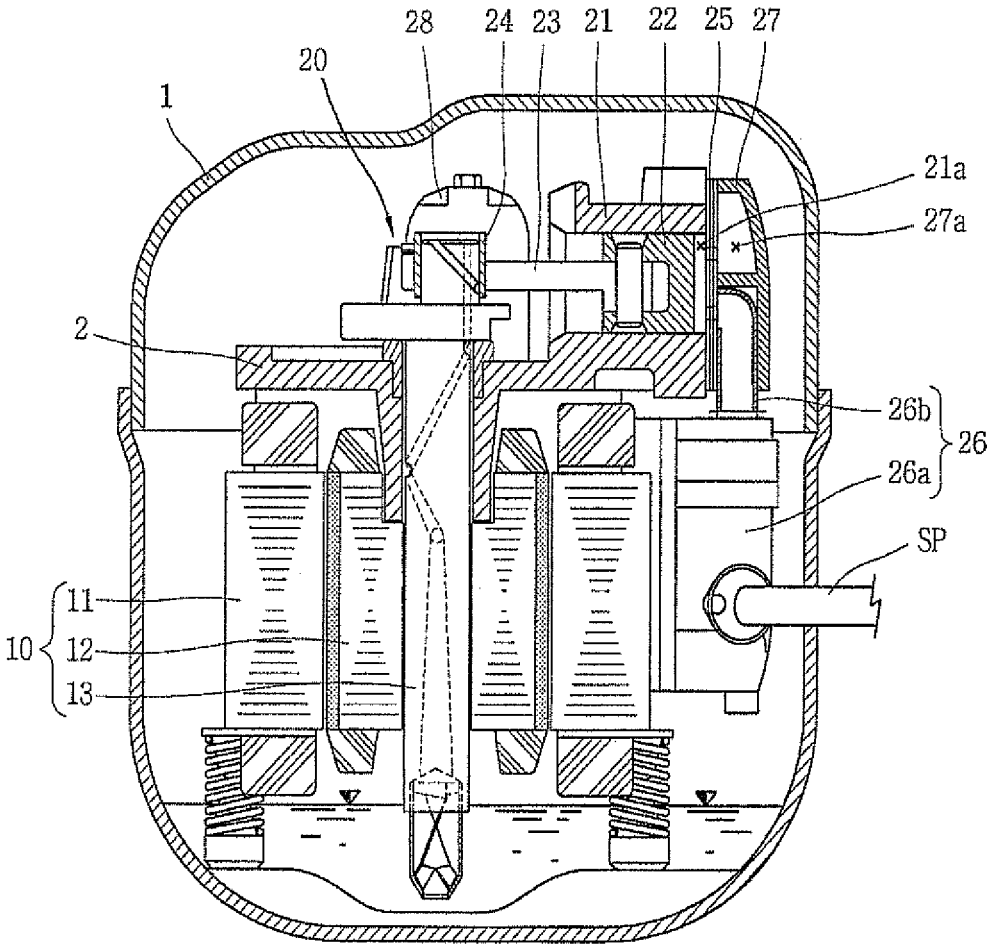
FIG. 1 is a longitudinal sectional view of an exemplary reciprocating compressor.

FIG. 1 is a longitudinal sectional view of an exemplary embodiment of a reciprocating compressor. As shown in FIG. 1, the exemplary reciprocating compressor may include a motor 10 installed in a hermetic casing 1, and a compression device 20 installed above the motor 10 and receiving a rotational force from the motor 10 to compress a refrigerant. The motor 10 may include a stator 11 elastically supported in the hermetic casing 1 by a frame 2, a rotor 12 rotatably installed in the stator 11, and a crankshaft 13 coupled to a center of the rotor 12 to transfer a rotational force to the compression device 20.

The compression device 20 may include a cylinder block 21 forming a compression chamber 21a, a piston 22 reciprocating in an axial direction within the compression chamber 21a of the cylinder block 21 so as to compress a refrigerant, a connecting rod 23 having a first end rotatably coupled to the piston 22 and a second end rotatably coupled to the crankshaft 13 to convert a rotary motion of the motor 10 into a linear motion of the piston 22, a sleeve 24 inserted between the crankshaft 13 and the connecting rod 23 to serve as a bearing, a valve assembly 25 coupled to an end portion of the cylinder block 21 and including a suction valve and a discharge valve, a suction muffler 26 coupled to a suction side of the valve assembly 25, a head cover 27 coupled to accommodate a discharge side of the valve assembly 25, and a discharge muffler 28 communicating with the head covet 27 to attenuate discharge noise of the discharged refrigerant. In this exemplary embodiment, a connection type reciprocating compressor will be referred to as a reciprocating compressor, for ease of discussion and explanation.

The suction muffler 26 may include a muffler main body 26a having a suction opening on a side surface of a suction side noise space and a discharge opening on an upper surface of the suction side noise space, and a connection pipe 26b extending from the discharge opening of the muffler main body 26a and connected to a suction side of the valve assembly 25. A plurality of noise spaces to attenuate suction noise and pressure pulsation, which are generated while the refrigerant is suctioned, may be formed within the suction muffler 26. The connection pipe 26b may be covered by the head cover 27 and coupled to communicate with a suction passage of the valve assembly 25 in a closely adhered manner. The head cover 27 may be made of a metal material so as to support the connection pipe 26b of the suction muffler 26, and may be coupled to the cylinder block 21 by bolts. The discharge muffler 28 may be made of a metal material, formed in a dome shape, and may be installed on an upper surface of the cylinder block 21. The discharge muffler 28 may communicate with a discharge side of the head cover 27 through a discharge passage which penetrates through the cylinder block 21. Accordingly, the discharge muffler 28 may be spaced apart from the suction muffler 26 by a predetermined interval.

A refrigerant suction pipe SP may guide a refrigerant passing through a refrigerating cycle into an inner space of the hermetic casing, or may communicate directly with the discharge opening of the suction muffler 26.

In this exemplary reciprocating compressor, when power is applied to the motor 10, the rotor 12 may be rotated together with the crankshaft 13 to reciprocate the piston 22 via the connecting rod 23. In response to the reciprocation of the piston 22, refrigerant may be introduced into the compression chamber 21a of the cylinder block 21 via the suction side noise space of the suction muffler 26 and be compressed in the compression chamber 21a. The compressed refrigerant may be discharged into the head cover 27 through the discharge valve of the valve assembly 25 and then discharged into the refrigerating cycle through the discharge muffler 28. This series of processes may be repetitively carried out.

However, the suction muffler 26, the head cover 27 and the discharge muffler 28 of this exemplary reciprocating compressor are fabricated as separate components and assembled. This may increase the number of assembly procedures, and cause a gap between the suction muffler 26 and the head cover 27 such that the refrigerant may leak out, which may lower compressor performance.

Also, the head cover 27 may secure the suction muffler 26 by covering the suction muffler 26. Accordingly, as the suction muffler 26 is heated due to the refrigerant discharged to the head cover 27, a specific volume of the suctioned refrigerant increases, resulting in suction loss. The cylinder block 21 may also be overheated due to the high temperature refrigerant discharged to the discharge muffler 28, thereby lowering compression efficiency of the compression chamber 21a.

In this exemplary reciprocating compressor, the connection pipe [26h] *26b* of the suction muffler 26 communicates with the compression chamber 21a through insertion into the head cover 27, and the discharge muffler 28, communicates with the compression chamber 21a through the discharge passage of the cylinder block 21. Accordingly, the suction passage and the discharge passage are increased in length, and flow resistance of the refrigerant is increased a corresponding amount, lowering compression performance.

In this exemplary reciprocating compressor, the head cover 27 and the discharge muffler 28 are casted or plated using a metal material, which may increase material costs and increase in fabricating costs due to lower mechanical properties.

In this exemplary reciprocating compressor, the plurality of noise spaces may be provided in the inner space of the suction muffler 26, and in the inner space of the discharge muffler [27] *28*. However, this may limit the formation of complicated noise spaces in the inner spaces of the suction muffler 26 and the discharge muffler 28 is a small sized compressor. On the other hand, if the noise spaces of each muffler 26 and [27] *28* are reduced, taking this limitation into account, a noise removal effect of the mufflers 26 and [27] *28* may be reduced a corresponding amount.

Figure 2:
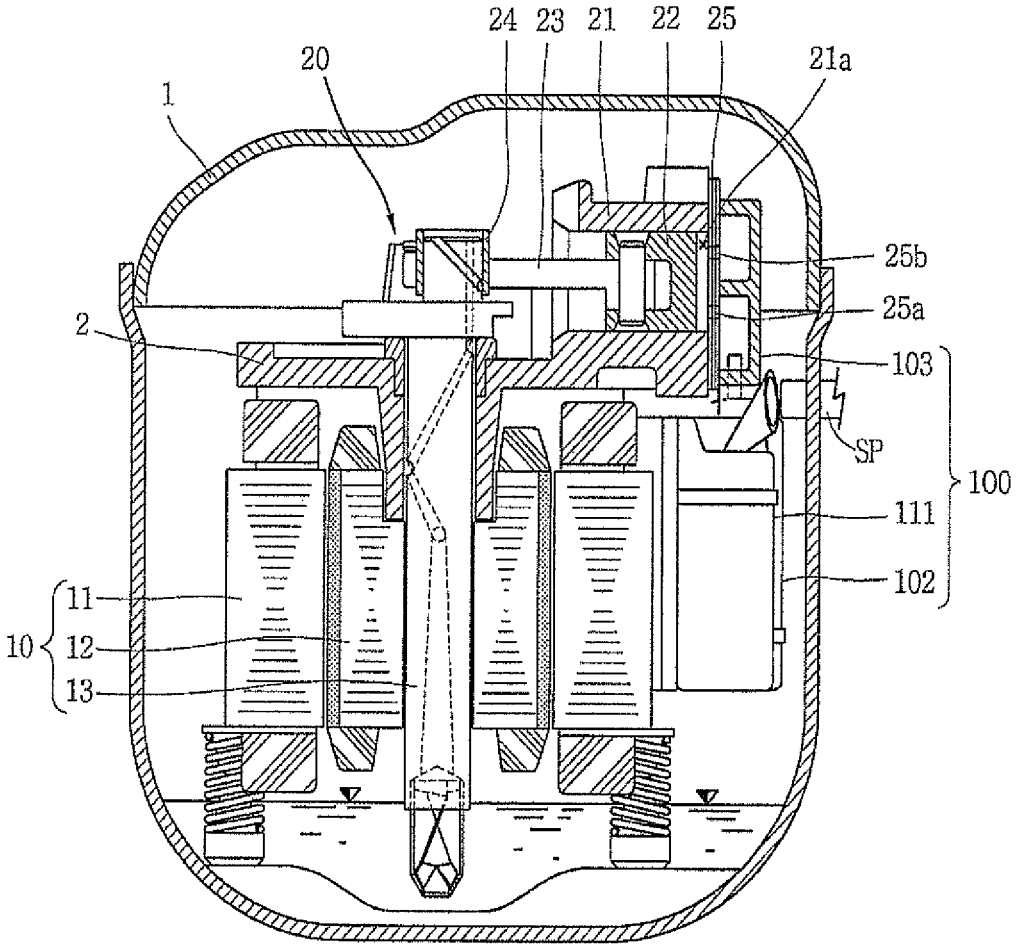
FIG. 2 is a longitudinal sectional view of a reciprocating compressor, in accordance with an embodiment as broadly described herein.
Figure 3:
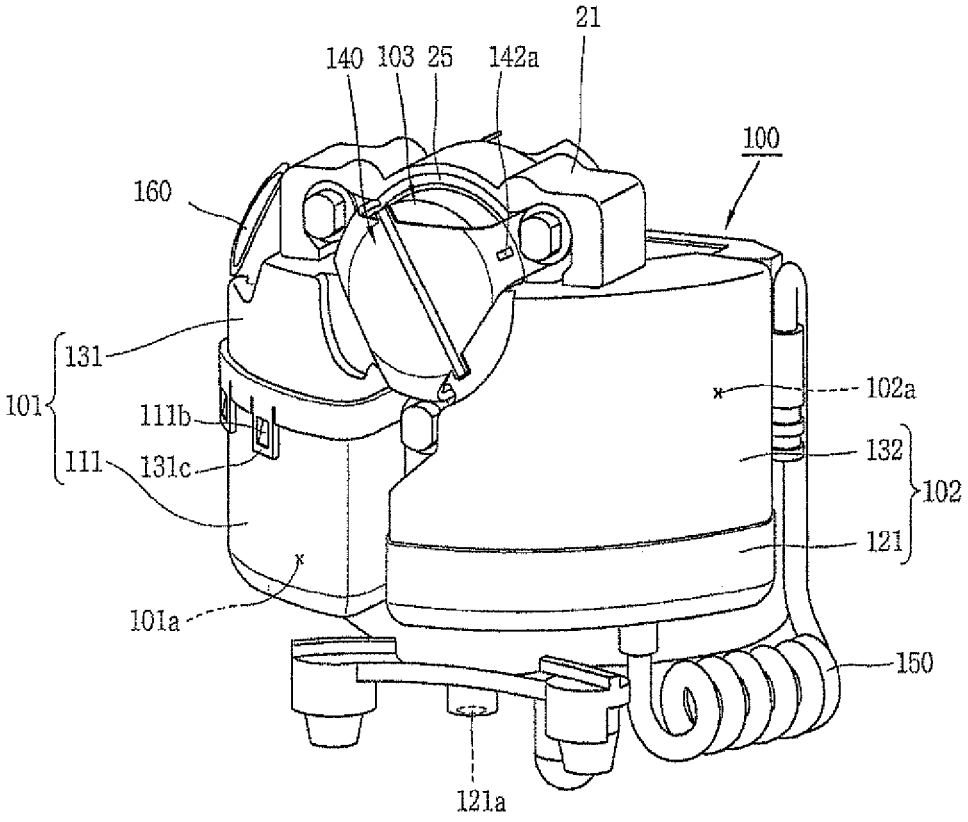
FIG. 3 is a front perspective view of an integral muffler of the compressor shown in FIG. 2.
Figure 4:
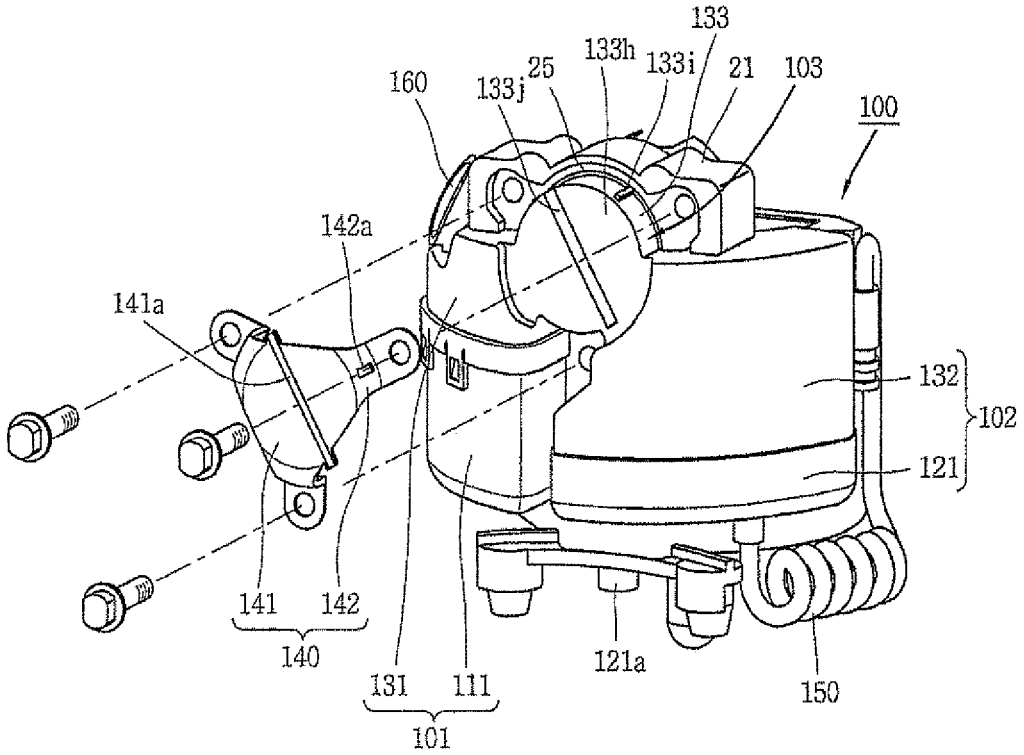
FIG. 4 is a disassembled perspective view of a fixing device which fixes the integral muffler shown in FIG. 3 to a compression device of the compressor shown in FIG. 2.
Figure 5:
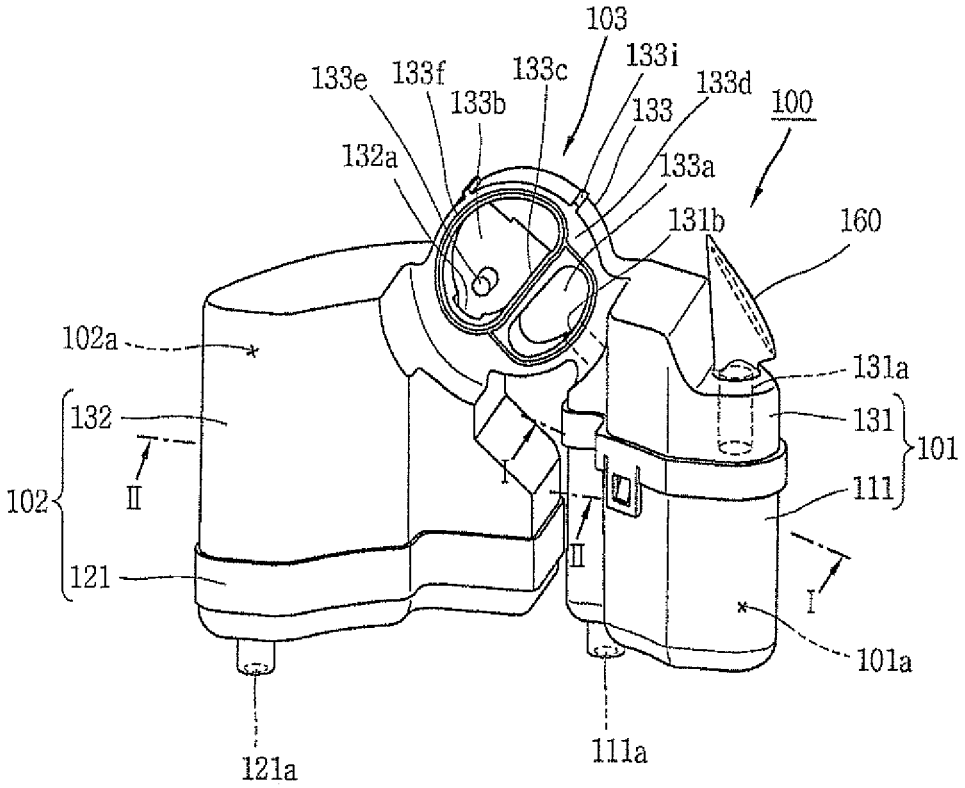
FIG. 5 is a rear perspective view of the integral muffler shown in FIG. 3.

FIG. 2 is a longitudinal sectional view of a reciprocating compressor including an integral muffler in accordance with an embodiment as broadly described herein, FIG. 3 is a front perspective view of the integral muffler shown in FIG. 2, FIG. 4 is a disassembled perspective view of a fixing device, and FIG. 5 is a rear perspective view of the integral muffler shown in FIG. 3.

As shown in FIG. 2, a reciprocating compressor having a muffler as embodied and broadly described herein may include a casing 1, a motor 10 installed in an inner space of the casing 1 and having a stator 11, a rotor 12 and a rotation shaft 13 to generate a rotational force, and a compression device 20 coupled to the rotation shaft 13 of the motor 10 to suction and compress a refrigerant by the rotation force transferred from the motor 10. The compression device 20 may include a cylinder block 21, a piston 22, a connecting rod 23, a sleeve 24, and a valve assembly 25. An integral muffler 100 may be coupled at a side of the compression chamber 21a of the cylinder block 21.

As illustrated in FIGS. 3 to 5, the integral muffler 100 may include a suction noise device 101 communicating with a suction opening 25a of the valve assembly 25, a discharge noise device 102 located at one side of the suction noise device 101 to communicate with a discharge opening 25b of the valve assembly 25, and a connection-fixing device 103 closely adhered onto the valve assembly 25 and coupled to the cylinder block 21 so as to connect the suction noise device 101 and the discharge noise device 102 to each in a manner that the suction noise device 101 may communicate with the suction opening 25a and the discharge noise device 102 may communicate with the discharge opening 25b.

Figure 6:
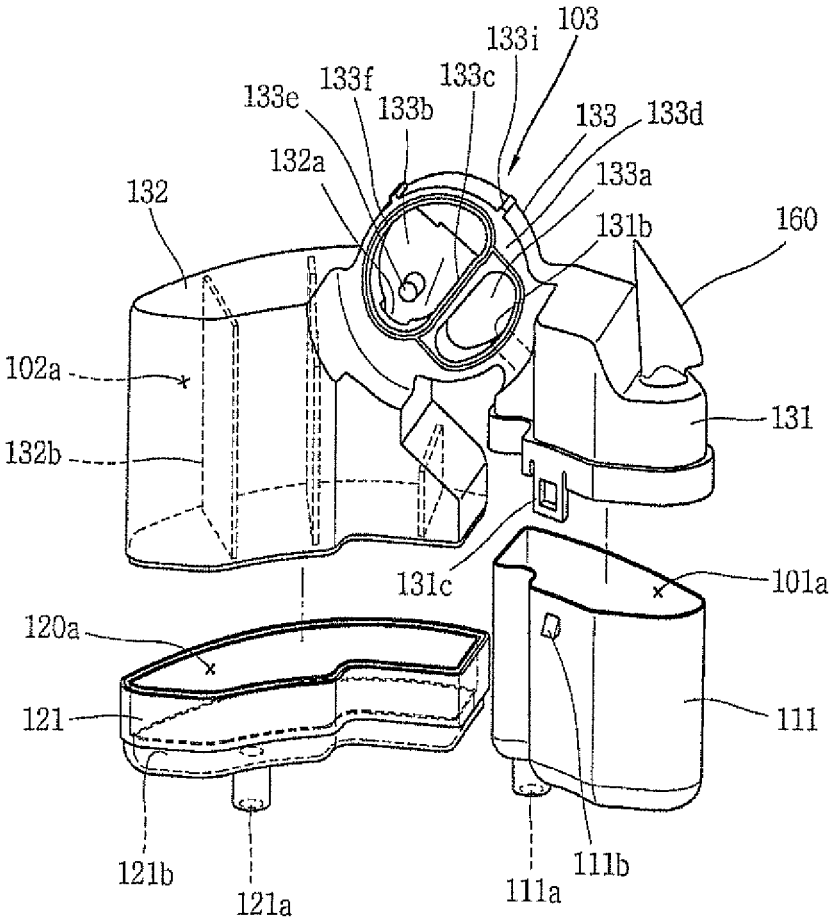
FIG. 6 is a perspective view of a lower housing shown in FIG. 5, separated from the integral muffler.
Figure 7:
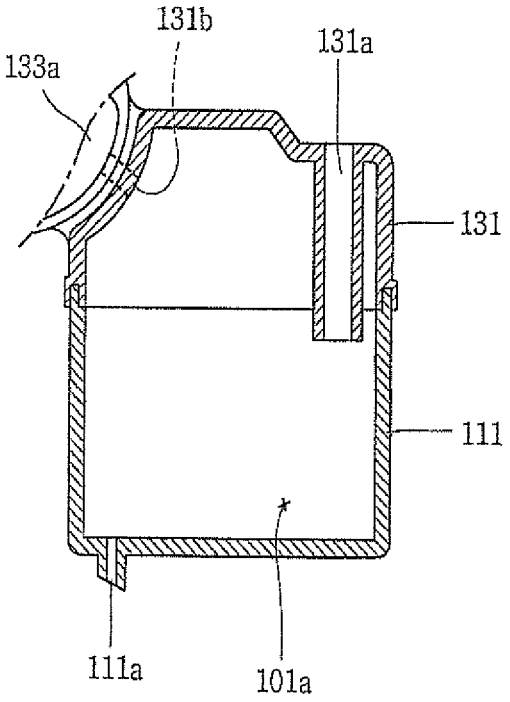
FIG. 7 is a sectional view taken along the line "I-I" of FIG. 5, providing an inner sectional view of a suction noise device.

As illustrated in FIGS. 5 to 7, the suction noise device 101 may include a suction side upper housing 131, and a suction side lower housing 111 forming a suction side noise space 101a together with the suction side upper housing 131.

The suction side upper housing 131 forming the suction side noise space 101a, as illustrated in FIG. 7, may include an inlet 131a in communication with the inner space of the casing 1 or directly connected with a suction pipe SP. The inlet 131a may be formed on an upper surface of the suction side upper housing 131 in a perpendicular direction toward a bottom surface of the suction side lower housing 111. However, in some cases, the inlet 131a may be formed on a side surface of the suction side upper housing 131 or on the suction side lower housing 111.

However, in certain embodiments the inlet 131a may be formed in parallel to a suction guide opening 131b or by a similar angle, if possible, such that refrigerant may be guided to the suction guide opening 131b while fully circulating, or orbiting, in the suction side noise space 101a and simultaneously noise emitted from the compression device 20 may be fully attenuated in the suction side noise space 101a without flowing out through the suction guide opening 131b. Here, the inlet 131a may be simply formed in a shape of a hole, but, as illustrated in FIG. 7, may, in certain embodiments, be formed in a shape of a long pipe, in the interest of noise attenuation. When the inlet 131a is formed in the shape of a pipe, refrigerant introduced into the suction side noise space 101a may be guided toward a bottom of the space 101a.

An inner side of the suction side noise space 101a may be divided into a plurality of noise chambers. However, depending on a size of the compressor, as illustrated in FIG. 6, it may not have to be divided into a plurality of noise chambers. In this case, the suction guide opening 131b and a suction chamber 133a provided at the connection-fixing device 103 may serve as a type of Helmholtz resonator. Therefore, noise may be appropriately reduced even without forming the plurality of noise chambers in the suction side noise space 101a. This may result in simplification of a structure of the suction side lower housing 111 which forms the suction side noise space 101a.

The suction guide opening 131b may be formed through another side of the suction side noise space 101a. The suction guide opening 131b may guide refrigerant introduced into the suction side noise space 101a toward the compression chamber 21a of the cylinder block 21. The suction guide opening 131b, as aforementioned, may be formed through the suction side upper housing 131 with an angle in parallel to the inlet 131a.

An oil outlet 111a may be formed through a bottom surface of the suction side noise space 101a. Oil which is separated from the refrigerant in the suction side noise space 101a may be discharged into the inner space of the casing 1 through the oil outlet 111a. The oil outlet 111a may be formed away from the inlet 131a. For example, when the suction side noise space 101a is divided into two areas in a horizontal direction, the inlet 131a and the oil outlet 111a may be formed in different areas to sufficiently separate and discharge the oil.

Figure 8:
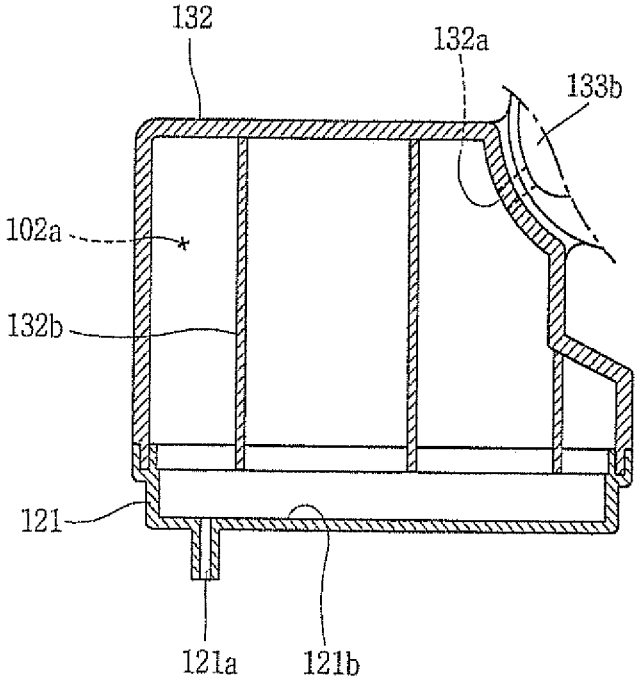
FIG. 8 is a sectional view taken along the line "II-II" of FIG. 5, providing an inner sectional view of a discharge noise device.

As illustrated in FIGS. 5, 6 and 8, the discharge noise device 102 may include a discharge side upper housing 132, and a discharge side lower housing 121 forming a discharge side noise space 102a together with the discharge side upper housing 132.

A discharge guide opening 132a may be formed through one side of the discharge side noise space 102a. The discharge guide opening 132a may communicate with the compression chamber 21a such that the compressed refrigerant may be introduced into the discharge side noise space 102a. An outlet 121a may be formed through another side of the discharge side noise space 102a such that the refrigerant of the discharge side noise space 102a may be guided toward a discharge hose 150. The outlet 121a, as illustrated in FIG. 8, may be formed through a bottom surface of the discharge noise device 102, but in some cases, may also be formed through the discharge side upper housing 132. However, the outlet 121a may be formed away from the discharge guide opening 132a, such that a refrigerant may be guided toward the discharge guide opening 132a while fully circulating, or orbiting, in the discharge side noise space 102a and simultaneously noise emitted by the compression device 20 may be fully attenuated in the discharge side noise space 102 without flowing out through the outlet 121a. For example, when the discharge side noise space 102a is divided into two areas in a horizontal direction, the discharge guide opening 132a and the outlet 121a may be formed in different areas to sufficiently attenuate and discharge discharged noise or pressure pulsation.

A plurality of reinforcing ribs 132b, as illustrated in FIGS. 6-8, may be formed on an inner circumferential surface of the discharge side noise space 102a. A high pressure refrigerant may be discharged into the discharge side noise space 102a and accordingly, the discharge side upper housing 132 forming the discharge side noise space 102a may be vulnerable to burst due to the discharge pressure of the refrigerant. Hence, the reinforcing ribs 132b may be formed along the inner circumferential surface of the discharge side noise space 102a so as to increase internal pressure strength of the discharge side upper housing 132.

In addition, the reinforcing ribs 132b may be formed long toward an open surface so as to facilitate separation of a core during molding of the discharge side upper housing 132. However, the reinforcing ribs 132b may be formed on an outer circumferential surface of the discharge side upper housing 132 forming the discharge side noise space 102a, in a manner of having a predetermined width. Even in this case, the reinforcing ribs 132b may be formed long in an up and down, or vertical, direction, in view of an advantage during molding.

An upper end of each reinforcing rib 132b may come in contact with an inner circumferential surface of an upper side of the discharge side upper housing 132, and a lower end thereof may extend up to an intermediate height of the discharge side noise space 102a, thereby ensuring a flow path for the refrigerant therethrough. However, when the length of the reinforcing rib 132b is further increased, the internal pressure strength of the discharge side upper housing 132 may also be increased. Hence, the reinforcing rib 132b may extend up to an open end of the discharge side upper housing 132, if possible. In this case, a refrigerant flow recess 121b may be formed with a predetermined depth, spaced apart from the lower end of the reinforcing rib 132b, so as to form a refrigerant flow path. The outlet 121a may be formed through the refrigerant flow recess 121b.

The reinforcing ribs 132b may divide the discharge side noise space 102a into a plurality of noise chambers. However, when the discharge side upper housing 132 is formed to have a thickness or strength tolerable to internal pressure, the reinforcing ribs 132b may not be necessary. In this case, since the discharge guide opening 132a and a discharge chamber 133b serve as a type of Helmholtz resonator, noise may be appropriately attenuated even without forming the plurality of noise chambers in the discharge side noise space 102a.

As illustrated in FIGS. 4 and 5, the connection-fixing device 103 may include a connection housing 133 which integrally connects the suction side upper housing 131 and the discharge side upper housing 132 to each other. The connection housing 133 may be integrally formed between the suction side upper housing 131 and the discharge side upper housing 132.

The connection housing 133 may include a suction chamber 133a formed on a surface facing the valve assembly 25 and communicating with the suction guide opening 131b, and a discharge chamber 133b formed at one side of the suction chamber 133a and communicating with the discharge guide opening 132a. A barrier wall 133c may be provided between the suction chamber 133a and the discharge chamber 133b, partitioning the suction chamber 133a and the discharge chamber 133b from each other.

The suction chamber 133a and the discharge chamber 133b may be formed with predetermined depths and widths on one side surface of the connection housing 133, namely, on a sealing surface 133d facing the valve assembly 25. A retainer 133e which restricts an open level of a discharge valve 25d coupled to the valve assembly 25 may protrude from the discharge chamber 133b. The retainer 133e may be formed adjacent to the discharge guide opening 132a.

Figure 9:
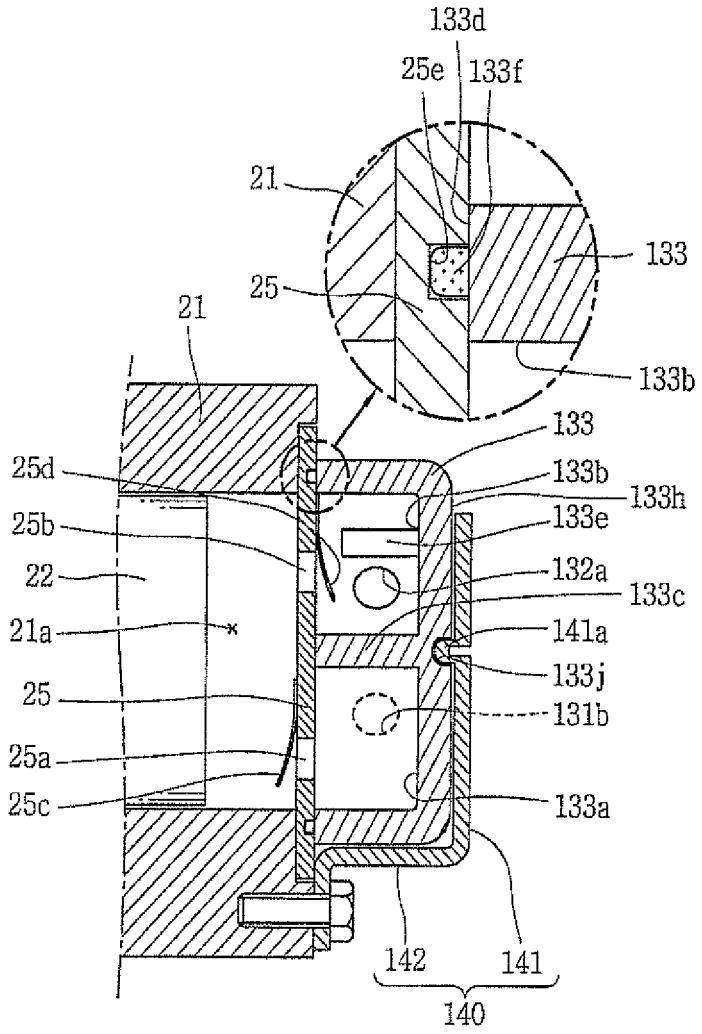
FIG. 9 is a sectional view of a connection-fixing device coupled to a cylinder block of the integral muffler.

As illustrated in FIGS. 6 and 9, a sealing protrusion 133f, which has a predetermined height, may be formed on the sealing surface 133d of the connection housing 133, so as to surround the periphery of the suction chamber 133a and the discharge chamber 133b, thereby forming a seal between the suction chamber 133a and the discharge chamber 133b. The sealing protrusion 133f may be integrally formed with the sealing surface 133d, or coated as a separate sealant.

A sealing groove 25e with a predetermined depth for insertion of the sealing protrusion 133f therein may be formed on a sealing surface of the valve assembly 25 facing the sealing protrusion 133f.

Figure 11:
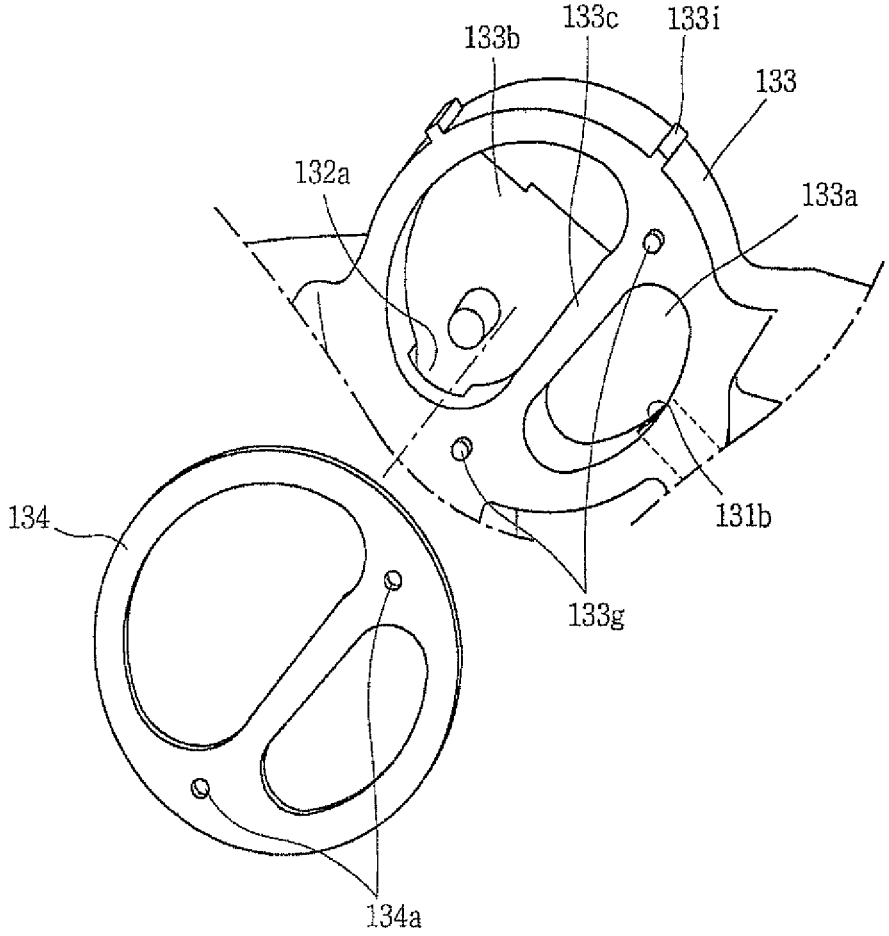
FIG. 11 is a perspective view of a fixing device of the integral muffler.

Here, the sealing protrusion 133f may be formed by coating a material with elasticity on the sealing surface 133d, but in some cases, as illustrated in FIG. 11, a separate sealing device 134, such as a gasket, may be installed without forming the sealing protrusion 133f on the connection housing 133. When the sealing device 134 is installed, supporting protrusions 133g supporting the sealing device 134 may be formed on the sealing surface 133d of the integral muffler or the sealing surface of the valve assembly 25, such that the sealing device 134 may be provisionally assembled to a proper position. In this case, the sealing device 134 may include supporting recesses 134a in which the supporting protrusions 133g are inserted.

A mounting surface 133h on which a fixing device 140 may be coupled may be evenly formed on the other side surface of the connection housing 133, namely, an opposite surface of the sealing surface 133d.

On the other hand, the suction side lower housing 111 and the discharge side lower housing 121 may be formed of a PBT material which is relatively inexpensive and has relatively low internal pressure strength, whereas the suction side upper housing 131, the discharge side upper housing 132 and the connection housing 133 may be formed of a material, such as nylon 66, which is relatively expensive but has relatively high internal pressure strength. Hence, the discharge side upper housing 132 may be formed greater than the suction side upper housing 131, in view of preventing the discharge noise device 102 from bursting. That is, since the discharge noise device 102 is filled with a refrigerant having a discharge pressure that is higher than the suction pressure of the suction noise device 101, the components forming the discharge noise device 102 may employ a material having relatively high internal pressure strength. Therefore, a volume of the discharge side upper housing 132 may be made of the material having the relatively high internal pressure strength greater than that of the suction side upper housing 131 made of the material having the relatively low internal pressure strength.

Since internal pressure of the suction noise device 101 is not higher than internal pressure of the casing 1, the suction side lower housing 111 and the suction side upper housing 131 may effectively block leakage of refrigerant even upon assembly using a hook 111b and a hook recess 131c. The discharge side lower housing 121 and the discharge side upper housing 132 of the discharge noise device 102 may be completely sealed in an ultrasonic welding or laser welding manner, so as to prevent leakage of refrigerant.

The integral muffler 100 may include a through hole formed therethrough so as to be coupled to the cylinder block 21 together with the valve assembly 25. However, when the integral muffler 1011 is formed of a material, such as plastic, with relatively low strength, it may be coupled to the cylinder block 21 together with the valve assembly 25 using a separate fixing device 140, such as, for example, a clamp.

In this case, the fixing device 140 may be formed of a metallic material to maintain coupling strength. The fixing device 140 may be formed in a shape of a tripod having at least three coupling legs 142 on an outer circumferential surface of a fixing unit 141, in such a manner that the connection housing 133 of the integral muffler 100, which covers the fixing device 140, may be partially exposed without being completely shielded by the fixing device 140.

In order for the fixing device 140 to stably support the integral muffler 100, position-fixing protrusions 133i may be formed on an outer circumferential surface of the integral muffler 100, and position-fixing recesses 142a in which the position-fixing protrusions 133i are inserted may be formed on an inner circumferential surface of the coupling leg(s) 142 of the fixing device 140. The positions of the position-fixing protrusions and the position-fixing recesses may be reversed.

A pressed portion 133j may be formed on the connection housing 133 of the integral muffler 100. The pressed portion 133j may be pressed by the fixing device 140 such that the sealing protrusion 133f or the sealing device 134 may be closely adhered onto the opposite side. A pressing portion 141a may be formed as a protrusion from the fixing unit 141 of the fixing device 140 toward the pressed portion and inserted into the pressed portion 133j of the connection housing 133 to press the pressed portion 133j, such that the pressed portion 133j presses the connection housing 133 to be closely adhered onto the valve assembly 25. The pressed portion 133j may be formed on a position aligned with the barrier wall 133c to tightly block the suction chamber 133a and the discharge chamber 133b.

Figure 10:
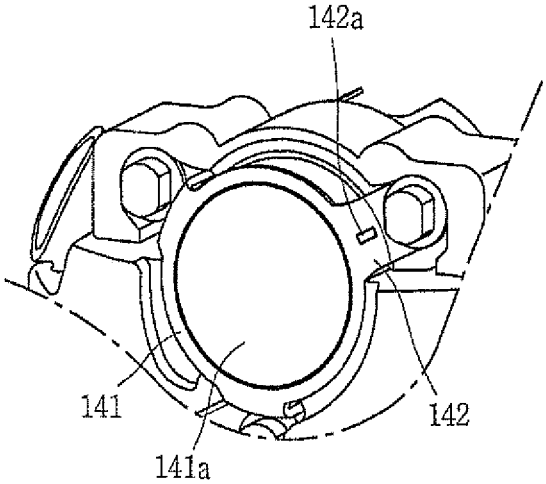
FIG. 10 is a perspective view of a sealing device provided between the integral muffler and a compression device.

The pressing portion 141a, as illustrated in FIGS. 3 and 4, may protrude from an inner side surface of the fixing unit 141 into a rectangular shape, to be inserted into the pressed portion 133j of the connection housing 133 and press the pressed portion 133j. Or, as illustrated in FIG. 10, the pressing portion 141a may be formed on an inner side surface of the fixing unit 141 into a shape of a circular protrusion to press the entire connection housing 133. Alternatively, the coupling legs 142 of the fixing device 140 may be bent such that the fixing device 140 may exert an elastic force toward the connection housing 133, thereby fixing the integral muffler 100.

A suction guide pipe 160 may guide refrigerant into the muffler 100.

A muffler for a compressor as embodied and broadly described herein may provide the following operation effects.

That is, when the rotor 12 is rotated in response to external power applied, the rotation shaft 13 press-fit in the rotor 12 may be rotated. The rotation of the rotation shaft 13 may be converted into a horizontal motion by the connecting rod 23 connected to a cam. In response to this, the piston 22 may reciprocate within the cylinder block 21. According to the reciprocation of the piston 22, refrigerant may be drawn into the compression chamber 21a of the cylinder block 21 through the suction noise device 101 and the suction chamber 133a of the integral muffler 100. The compressed refrigerant may be introduced into the discharge side noise space 102a of the discharge noise device 102 via the discharge chamber 133b of the integral muffler 100, and then discharged into a refrigerating cycle through the discharge hose 150 and a discharge pipe. Such series of processes may be repetitively carried out.

Suction noise and pressure pulsation, which may be generated while the refrigerant is suctioned, may be attenuated in the suction side noise space 101a and the suction chamber 133a of the suction noise device 101. On the other hand, discharge noise and pressure pulsation, which may be generated while the refrigerant is discharged, may be attenuated in the discharge side noise space 102a and the discharge chamber 133b of the discharge noise device 102.

In such a manner, the integral muffler as embodied and broadly described herein may be formed by including the suction side lower housing forming the suction noise device, the discharge side lower housing forming the discharge noise device, and the connection housing connecting a suction side upper housing and a discharge side upper housing, both of which seal the suction side lower housing and the discharge side lower housing in a covering manner. This may minimize the number of components of the integral muffler, thereby simplifying assembly procedures.

By integrally forming a suction side and a discharge side of a connection-fixing device which comes in contact with the valve assembly, generation of a stepped portion on a sealing surface of the connection-fixing device may be prevented in advance. In addition, the sealing protrusion may be formed on the sealing surface of the connection-fixing device, thereby effectively preventing leakage of refrigerant between the suction chamber and the discharge chamber.

The suction noise device and the discharge noise device may be integrally formed by the connection-fixing device and directly coupled to the compression device. This may reduce lengths of the suction passage and the discharge passage and accordingly decrease flow resistance experienced by the refrigerant, thereby improving compressor performance.

The suction noise device and the discharge noise device may be formed of a plastic material, which may lower material costs and improve mechanical properties, resulting in a reduction of fabricating costs.

The suction side noise space and the suction chamber forming the suction side noise device may be separately formed and the discharge chamber and the discharge side noise space forming the discharge noise device may be separately formed, thereby simplifying the structures of the suction side noise space and the discharge side noise space. In addition, noise removal effect may be increased by using the suction chamber and the discharge chamber, so as to reduce overall size of the muffler and increase noise removal effects.

Figure 12:
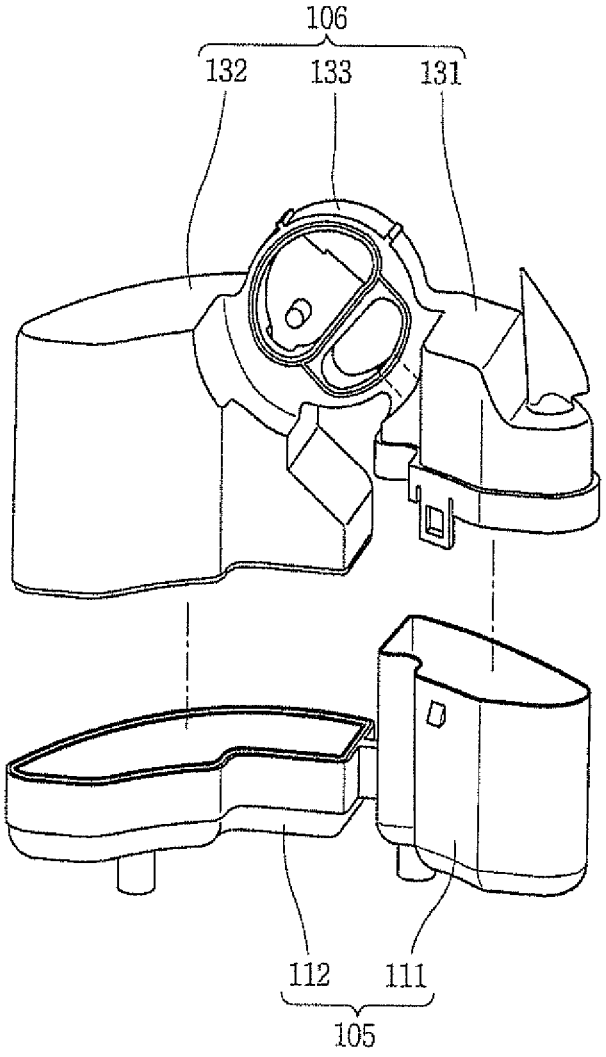
FIG. 12 is a perspective view of an integrally formed a suction side lower housing and a discharge side lower housing.

In the foregoing embodiment, the suction side lower housing and the discharge side lower housing may be independently formed and coupled to the suction side upper housing and the discharge side upper housing. However, referring to FIG. 12, the suction side lower housing 111 and the discharge side lower housing 121 may be formed integral with each other. Even in this case, the basic configuration and the operation effects may be the same as or similar to the foregoing embodiment. However, in the configuration, the number of components to be assembled may be further reduced, including the lower housing 105 having the suction side lower housing 111 and the discharge side lower housing 121, and the upper housing 106 having the suction side upper housing 131, the discharge side upper housing 132, and the connection housing 133. This may result in further reduction of the assembly procedures of the muffler.

A muffler for a compressor and a compressor having the same are provided that are capable of facilitating assembly of a suction muffler and a discharge muffler, and of preventing refrigerant leakage through an assembled portion of the suction muffler and the discharge muffler.

A muffler for a compressor and a compressor having the same are provided that are capable of reducing suction loss by preventing overheat of an introduced refrigerant, and accordingly enhancing compressor efficiency.

A muffler for a compressor and a compressor having the same are provided that are capable of enhancing compressor efficiency by reducing suction loss and discharge loss by reducing lengths of a suction passage and a discharge passage to decrease flow resistance.

A muffler for a compressor and a compressor having the same are provided that are capable of reducing fabricating costs by reducing material costs of a suction muffler and a discharge muffler and increasing mechanical properties.

A muffler for a compressor and a compressor having the same are provided that are capable of reducing a size thereof while maintaining a noise removal effect.

A muffler for a compressor communicating with a compression chamber having a suction opening and a discharge opening and coupled to a compression unit, as embodied and broadly described herein, may include a suction noise unit having a suction side noise space communicating with the suction opening of the compression chamber, a discharge noise unit having a discharge side noise space communicating with the discharge opening of the compression chamber, and a connection-fixing unit integrally connecting the suction noise unit and the discharge noise unit to each other.

A compressor, as embodied and broadly described herein, may include a casing, a cylinder block disposed in the casing and having a compression chamber, a valve assembly installed on a front surface of the cylinder block and having a suction opening and a discharge opening communicating with the compression chamber, and an integral muffler comprising a suction noise unit having a suction side noise space communicating with the suction opening of the compression chamber, a discharge noise unit having a discharge side noise space communicating with the discharge opening of the compression chamber, and a connection-fixing unit integrally connecting the suction noise unit and the discharge noise unit with each other.

In a muffler for a compressor and a compressor having the same, as embodied and broadly described herein, a suction noise unit and a discharge noise unit may be integrally formed with each other. This may reduce the number of components configuring a suction side muffler and a discharge side muffler so as to reduce assembly procedures, and also reduce leakage of refrigerant generated at an assembled portion of the muffler so as to improve compressor performance.

The division between the suction noise unit and the discharge noise unit may prevent discharged refrigerant from heating a suctioned refrigerant. This may prevent an increase in a specific volume of the suctioned refrigerant, resulting in a reduction of suction loss.

The suction noise unit and the discharge noise unit may be integrally formed by a connection-fixing unit so as to be coupled directly to a compression unit. This may shorten lengths of a suction passage and a discharge passage, resulting in improved compressor performance.

The formation of the suction noise unit and the discharge noise unit using a plastic material may result in a reduction of material costs and an increase in mechanical properties, reducing overall fabricating costs.

Also, in a manner that a suction side noise space and a suction chamber forming the suction noise unit are formed separate from each other and a discharge side noise space and a discharge chamber forming the discharge noise unit are formed separate from each other, the structures of the suction side noise space and the discharge side noise space may be simplified and noise effect may be increased using the suction chamber and the discharge chamber. This may reduce an overall size of the muffler and improve noise effect.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A muffler for a compressor, the muffler communicating with a compression chamber having a suction opening, which is opened and closed by a suction valve of a valve assembly, and a discharge opening, which is opened and closed by a discharge valve of the valve assembly, formed therein and being coupled to the valve assembly [of a compression portion], the muffler comprising:

a suction noise portion including a suction side noise space in communication with the suction opening of the compression chamber;

a discharge noise portion including a discharge side noise space in communication with the discharge opening of the compression chamber; and a connection-fixing portion that integrally connects the suction noise portion and the discharge noise portion to each other *and includes a connection housing*, wherein a portion of the suction noise portion and a portion of the discharge noise portion are integrally formed as a one-piece component [having] at a suction side and a discharge side [a] *of the* connection housing, [of] the connection-fixing portion *being* coupled to the valve assembly [of the compression portion], wherein an internal pressure strength of a material of the discharge noise portion is greater than an internal pressure strength of a material of the suction noise portion, wherein the suction noise portion includes a suction side upper housing and a suction side lower housing coupled to a lower end of the suction side upper housing so as to form the suction side noise space therebetween, wherein the discharge noise portion includes a discharge side upper housing and a discharge side lower housing such that the discharge side upper housing is coupled to the discharge side lower housing so as to form the discharge side noise space therebetween, wherein the suction side upper housing and the discharge side upper housing are integrally formed with two opposite sides of the connection housing of the connection-fixing portion [coupled to the compression portion], and wherein an internal pressure strength of materials of the suction side upper housing, the discharge side upper housing, and the connection housing are greater than an internal pressure strength of a material of the suction side lower housing [and] *or* the discharge side lower housing.

2. The muffler of claim 1, wherein the connection-fixing portion includes:

a suction chamber provided at a first side surface of the connection-fixing portion, in communication with the suction opening of the compression chamber;

a discharge chamber in communication with the discharge opening of the compression chamber, the suction chamber and the discharge chamber having predetermined depths and widths, respectively; and a barrier wall provided within the connection-fixing portion to partition the suction chamber from the discharge chamber.

3. The muffler of claim 2, further including a suction guide opening formed between the suction side noise space and the suction chamber, wherein a sectional area of the suction guide opening is less than a sectional area of the suction side noise space, and is less than a sectional area of the suction chamber.

4. The muffler of claim 2, further including a discharge guide opening formed between the discharge side noise space and the discharge chamber, wherein a sectional area of the discharge guide opening is less than a sectional area of the discharge side noise space, and is less than a sectional area of the discharge chamber.

5. The muffler of claim 2, further including a sealing protrusion formed at a mating surface of the suction chamber and the discharge chamber, wherein the sealing protrusion is integrally formed with one of the suction chamber or the discharge chamber and forms a single closed loop.

6. The muffler of claim 2, further including a sealing portion provided between the connection-fixing portion and the [compression portion] *value assembly*, *and* wherein the connection-fixing portion includes a plurality of supporting protrusions coupled to the sealing portion to support the sealing portion.

7. The muffler of claim 1, wherein the suction side upper housing and the discharge side upper housing are integrally formed having two opposite sides of the connection housing of the connection-fixing portion [coupled to the compression portion], wherein the connection-fixing portion includes a barrier wall provided in an interior space that partitions a suction chamber from a discharge chamber formed in the interior space, wherein the suction chamber is in communication with the suction opening, and wherein the discharge chamber is in communication with the discharge opening.

8. The muffler of claim 7, further including: an inlet formed through the suction noise portion to provide for communication between an inside and an outside of the suction side noise space; and a suction guide opening formed between the suction noise portion and the connection-fixing portion to provide for communication between the suction side noise space and the suction chamber, wherein an outlet end of the inlet is positioned below an inlet end of the suction guide opening.

9. The muffler of claim 7, further including:

a discharge guide opening formed between the connection-fixing portion and the discharge noise portion to provide for communication between the discharge chamber and the discharge side noise space; and an outlet formed through the discharge noise portion to provide for communication between an inside and an outside of the discharge side noise space.

10. The muffler of claim 1, further including at least one reinforcing rib formed as a protrusion on an inner circumferential surface or an outer circumferential surface of the discharge noise portion.

11. The muffler of claim 10, wherein the at least one reinforcing rib is formed on an inner circumferential surface of the discharge side upper housing, that extends in a vertical direction, and wherein a refrigerant passage is formed as a recess in a lower portion of the discharge side lower housing, spaced apart from a lower end of the at least one reinforcing rib by a predetermined interval.

12. The muffler of claim 1, wherein a volume of the discharge side upper housing is greater than a volume of the suction side upper housing, and a volume of the discharge side lower housing is greater than a volume of the suction side lower housing, and wherein the suction side lower housing and the discharge side lower housing are integrally formed.

13. A compressor including the muffler of claim 1.

14. A compressor, comprising a casing; a cylinder block of a compression portion provided in the casing and having a compression chamber; a valve assembly of the compression portion installed on the cylinder block and having a suction opening and a discharge opening in communication with the compression chamber; and an integral muffler coupled to the valve assembly so as to be in communication with the compression chamber, the integral muffler including:

a suction noise portion having a suction side noise space in communication with the suction opening of the valve assembly;

a discharge noise portion having a discharge side noise space in communication with the discharge opening of the valve assembly; and a connection-fixing portion that integrally connects the suction noise portion and the discharge noise portion to each other *and includes a connection housing*, wherein a portion of the suction noise portion and a portion of the discharge noise portion are integrally formed as a one-piece component [having] at a suction side and a discharge side [a] *of the* connection housing, [of] the connection-fixing portion *being* coupled to the valve assembly [of the compression portion], wherein an internal pressure strength of a material of the discharge noise portion is greater than an internal pressure strength of a material of the suction noise portion, wherein the suction noise portion includes a suction side upper housing and a suction side lower housing coupled to a lower end of the suction side upper housing so as to form the suction side noise space therebetween, wherein the discharge noise portion includes a discharge side upper housing and a discharge side lower housing such that the discharge side upper housing is coupled to the discharge side lower housing so as to form the discharge side noise space therebetween, wherein the suction side upper housing and the discharge side upper housing are integrally formed with two opposite sides of the connection housing of the connection-fixing portion [coupled to the compression portion], and wherein an internal pressure strength of materials of the suction side upper housing, the discharge side upper housing, and the connection housing are greater than an internal pressure strength of a material of the suction side lower housing [and] *or* the discharge side lower housing.

15. The compressor of claim 14, further a sealing portion formed at a mating surface between the connection-fixing portion and the valve assembly, wherein the sealing portion is integrally formed as a closed loop on one of the connection-fixing portion or the valve assembly.

16. The compressor of claim 14, further including a sealing portion inserted between mating surfaces of the connection-fixing portion and the valve assembly, wherein the sealing portion forms a closed loop.

17. The compressor of claim 14, wherein the connection-fixing portion is coupled to the cylinder block or to the valve assembly by a fixing portion that supports the connection-fixing portion.

18. The compressor of claim 17, further including a position-fixing portion formed on a contact surface between the connection-fixing portion and the fixing portion[, that fixes] *and fixing* the coupled position of the fixing portion and the connection-fixing portion.

*19. A compressor, comprising a casing; a cylinder block of a compression portion provided in the casing and having a compression chamber; a valve assembly of the compression portion installed on the cylinder block and having a suction opening and a discharge opening in communication with the compression chamber; and an integral muffler coupled to the valve assembly so as to be in communication with the compression chamber, the integral muffler including:*

*a suction noise portion having a suction side noise space in communication with the suction opening of the valve assembly;*

*a discharge noise portion having a discharge side noise space in communication with the discharge opening of the valve assembly; and*

*a connection-fixing portion that integrally connects the suction noise portion and the discharge noise portion to each other and includes a connection housing, wherein a portion of the suction noise portion and a portion of the discharge noise portion are integrally formed as a one-piece component at a suction side and a discharge side of the connection housing, the connection-fixing portion being coupled to the valve assembly,*

*wherein an internal pressure strength of a material of the discharge noise portion is greater than an internal pressure strength of a material of the suction noise portion,*

*wherein the suction noise portion includes a suction side upper housing and a suction side lower housing coupled to a lower end of the suction side upper housing so as to form the suction side noise space therebetween,*

*wherein the discharge noise portion includes a discharge side upper housing and a discharge side lower housing such that the discharge side upper housing is coupled to the discharge side lower housing so as to form the discharge side noise space therebetween,*

*wherein the suction side upper housing and the discharge side upper housing are integrally formed with two opposite sides of the connection housing of the connection-fixing portion, and*

*wherein materials of the suction side upper housing, the discharge side upper housing, and the connection hous-*

*ing are different from a material of the suction side lower housing or the discharge side lower housing.*

*20. The compress of claim 19, materials of the suction side upper housing, the discharge side upper housing and the connection housing are formed of a nylon material and a material of the suction side lower housing or the discharge side lower housing is formed of a PBT material.*

*21. The compressor of claim 19, further including a sealing portion formed at a mating surface between the connection-fixing portion and the valve assembly, wherein the sealing portion is integrally formed as a closed loop on one of the connection-fixing portion or the valve assembly.*

*22. The compressor of claim 19, further including a sealing member inserted between mating surfaces of the connection-fixing portion and the valve assembly.*

*23. The compressor of claim 19, wherein the connection-fixing portion is coupled to the cylinder block or to the valve assembly by a fixing portion that supports the connection-fixing portion.*

*24. The compressor of claim 23, wherein the fixing portion is formed of a metallic material.*

*25. The compressor of claim 23, wherein the fixing portion includes:*

*a position-fixing portion provided on a contact surface of the connection-fixing portion and fixing the coupled position of the fixing portion and the connection-fixing portion; and*

*at least three legs provided on an outer circumferential surface of the position-fixing portion, the at least three legs having a shape of a tripod.*

*26. The compressor of claim 25, wherein:*

*the integral muffler includes at least one position-fixing protrusion provided on an outer circumferential surface thereof, and*

*the fixing portion further includes at least one position-fixing recess, in which the position-fixing protrusion is inserted, the at least one position-fixing recess being formed on an inner circumferential surface of one of the at least three legs.*

*27. The compressor of claim 25, further including:*

*a pressed recess portion formed on the connection-fixing portion; and*

*a pressing protrusion portion provided on an inner side surface of the position-fixing portion and corresponding to the pressed recess portion,*

*wherein the pressing protrusion portion is inserted into the pressed recess portion.*

*28. The compressor of claim 25, wherein the at least three legs are bent to exert an elastic force toward the connection-fixing portion.*

*29. The compressor of claim 25, further including:*

*a passing hole formed in each of the at least three legs;*

*a fastening hole formed in the connection-fixing portion; and*

*a screw that passes through the passing hole and is fastened to the fastening hole.*

* * * * *